(12) United States Patent
Gajula et al.

(10) Patent No.: US 12,149,617 B2
(45) Date of Patent: Nov. 19, 2024

(54) METHOD AND APPARATUS FOR INITIATING A COMMUNICATION SESSION USING MISSION CRITICAL SERVICES

(71) Applicant: SAMSUNG ELECTRONICS CO., LTD., Suwon-si (KR)

(72) Inventors: Kiran Gajula, Bangalore (IN); Siva Prasad Gundur, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 17/543,019

(22) Filed: Dec. 6, 2021

(65) Prior Publication Data

US 2022/0094528 A1    Mar. 24, 2022

Related U.S. Application Data

(63) Continuation of application No. PCT/KR2020/007398, filed on Jun. 8, 2020.

(30) Foreign Application Priority Data

Jun. 6, 2019  (IN) .............................. 201941022508
Jun. 5, 2020  (IN) ............................ 2019 41022508

(51) Int. Cl.
*H04L 9/08*       (2006.01)
*H04L 65/1069*   (2022.01)
*H04L 65/1104*   (2022.01)

(52) U.S. Cl.
CPC .......... *H04L 9/088* (2013.01); *H04L 65/1069* (2013.01); *H04L 65/1104* (2022.05)

(58) Field of Classification Search
CPC ................. H04L 9/088; H04L 65/1104; H04L 65/1069
USPC ....................................................... 713/171
See application file for complete search history.

(56) References Cited

U.S. PATENT DOCUMENTS 11,363,074 B2 *   6/2022  Shah .................... H04L 65/1086
2006/0230168 A1 * 10/2006  Sung .................... H04L 65/1016
                                                    709/230
2017/0163607 A1    6/2017  Skuratovich et al.
(Continued)

FOREIGN PATENT DOCUMENTS

KR    10-1928756 B1    12/2018
WO    2018/078460 A1    5/2018
WO    2018/139910 A1    8/2018

OTHER PUBLICATIONS

Internet Engineering Task Force (IETF) M. Groves Request for Comments: 6509 CESG Category: Informational Feb. 2012 ISSN: 2070-1721.*

(Continued)

*Primary Examiner* — Tauqir Hussain
(74) *Attorney, Agent, or Firm* — Sughrue Mion, PLLC

(57) ABSTRACT

A method for initiating a private communication session by a user equipment (UE) includes: initiating, by the initiating UE, at least one private communication session with a terminating UE using a Session Initiation Protocol (SIP) INVITE message including an I_MESSAGE; and reusing, by the initiating UE, the I_MESSAGE for initiating at least one subsequent private communication session with the terminating UE.

18 Claims, 10 Drawing Sheets

(56) References Cited

U.S. PATENT DOCUMENTS

2017/0171732 A1\* 6/2017 Dao .................. H04W 76/50
2018/0314314 A1\* 11/2018 Link, II ............... G06F 1/3246

OTHER PUBLICATIONS

3rd Generation Partnership Project, Mar. 2019.\*
Motorol Solutions. Apr. 2019.\*
Communication dated Sep. 9, 2020 issued by the International Searching Authority in counterpart Application No. PCT/KR2020/007398 (PCT/ISA/220, PCT/ISA/210, and PCT/ISA/237).
Motorola Solutions et al., "[33.180] R16 Pre-established PCK", 3GPP TSG-SA WG3 Meeting #95, S3-191171, Apr. 29, 2019, 20 pages total.
"3rd Generation Partnership Project; Technical Specification Group Services and System Aspects; Security of the mission critical service; (Release 15)", 3GPP TS 33.180 V15.4.0, Technical Specification, Mar. 28, 2019, 199 pages total.
"3rd Generation Partnership Project; Technical Specification Group Core Network and Terminals Mission Critical Push To Talk (MCPTT) media plane control; Protocol specification (Release 16)", 3GPP TS 24.380 V16.1.0, Technical Specification, Mar. 27, 2019, 273 pages total.

\* cited by examiner

METHOD AND APPARATUS FOR INITIATING A COMMUNICATION SESSION USING MISSION CRITICAL SERVICES

CROSS-REFERENCE TO RELATED APPLICATIONS

This application is a bypass continuation application of International Application No. PCT/KR2020/007398, filed on Jun. 8, 2020, which claims priority from Indian Patent Provisional Application No. 201941022508 filed on Jun. 6, 2019 and Indian Patent Application No. 201941022508 filed on Jun. 5, 2020, the disclosures of which are incorporated by reference in their entireties

BACKGROUND

1. Field

The present disclosure relates to the field of Mission Critical (MC) services. More particularly, it is related to a method and apparatus for initiating a private communication session using mission critical (MC) services.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently in research. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

Various embodiments herein provide methods and systems for initiating a private communication session using Mission Critical (MC) services.

The embodiments provide methods and systems for enabling a User Equipment (UE) to create a Session Initiation Protocol SIP INVITE message including an I_MESSAGE in a Session Description Protocol (SDP) by generating a private communication session key payload for initiating at least one first private communication session with at least one other UE, and to reuse the created I_MESSAGE and the private communication session key for initiating at least one subsequent private communication session with the at least one same other UE.

The embodiments also provide methods and systems for enabling the UE to decode the I_MESSAGE for decrypting the private communication session key, on receiving the I_MESSAGE from the at least one other UE for the at least one first private communication session and to reuse the decoded I_MESSAGE and the decrypted PCK for the at least one subsequent private communication session received from the at least one same other UE.

According to an embodiment, there is provided a method for initiating a private communication session between UEs using Mission Critical (MC) services. The method may include: initiating, by a first UE, at least one first private communication session with a second UE using a Session Initiation Protocol (SIP) INVITE message including an I_MESSAGE in a Session Description Protocol (SDP). The method may further include reusing, by the first UE, the I_MESSAGE for initiating at least one subsequent private communication session with the second UE.

According to an embodiment, there is provided a communication system including a Mission Critical (MC) server; and a plurality of UEs coupled to the MC server, wherein a first UE of the plurality of UEs is configured to initiate at least one first private communication session with a second UE using an SIP INVITE message including an I_MESSAGE in an SDP, and the first UE is further configured to reuse the I_MESSAGE for initiating at least one subsequent private communication session with the second UE.

According to an embodiment, the at least one private communication session and the at least one subsequent private communication session may be initiated using MC services.

According to an embodiment, the at least one private communication session and the at least one subsequent private communication session may include at least one of a private voice call, a private data session, and a private video session.

According to an embodiment, the method may further include: fetching, by the first UE and the second UE, a key material from an MC server prior to the initiation of the at least one private communication session and the at least one subsequent private communication session for creating the I_MESSAGE in the SDP According to an embodiment, the key material may include a user signing key and a user decryption key to generate a unique identifier (UID) key of the first UE, and a UID key of the second UE.

According to an embodiment, the I_MESSAGE may be created using a Sakai-Kasahara Key Encryption in Multimedia Internet Keying (MIKEY_SAKKEY) encryption method.

According to an embodiment, the created I_MESSAGE includes an encrypted private communication key, a private communication session key identifier, and a signature.

According to an embodiment, the private communication key may be encrypted using the UID key of the second UE to secure the at least one private communication session and the at least one subsequent private communication session; the private communication session key identifier indicates a purpose of the private communication session key; and the signature includes the UID key of the first UE.

According to an embodiment, the method may further include: defining at least one validity value for the I_MESSAGE, wherein the at least one validity value is a predefined time period, wherein the at least one validity value is defined based on at least one of a frequency of private communication sessions initiated between the first UE and the second UE, and requirements of users of a communication system including the first UE and the second UE; mapping the I_MESSAGE with the validity value, the private communication session key included in the I_MESSAGE, and the UID key of the second UE; and storing the mapping of the I_MESSAGE, the validity value, the private communication session key, and the UID key of the second UE in the storage.

According to an embodiment, the method may further include: reusing, by the first UE, the stored I_MESSAGE for initiating the at least one subsequent private communication session with the second UE includes: checking whether the I_MESSAGE exists for the second UE (206b) using the stored mapping of the I_MESSAGE, the validity value, the private communication session key, and the UID key of the second UE, on detecting a trigger initiated for the at least one subsequent private communication session with the second UE; checking validity of the I_MESSAGE based on the validity value mapped with the corresponding I_MESSAGE, if the I_MESSAGE exists for the second UE; determining that the I_MESSAGE is valid, if the validity value mapped with the corresponding I_MESSAGE is not expired; fetching the I_MESSAGE from the stored mapping of the I_MESSAGE, the validity value, the private communication session key, and the UID key of the second UE, on determining that the I_MESSAGE is valid; and reusing the fetched I_MESSAGE for initiating the at least one subsequent private communication session with the second UE.

According to an embodiment, the method may further include: fetching, by the first UE, the private communication session key associated with the reused I_MESSAGE from the stored mapping of the I_MESSAGE, the validity value, the private communication session key, and the UID key of the second UE; and reusing, by the first UE, the fetched private communication session key to encrypt private communication packets related to the initiated at least one subsequent private communication session.

According to an embodiment, the method may further include: decoding, by the second UE, the I_MESSAGE to obtain the private communication session key, on receiving a private communication session initiation request including the I_MESSAGE from the first UE for the at least one private communication session; mapping, by the second UE, the received I_MESSAGE with the obtained private communication session key and the UID key of the first UE; storing, by the second UE, the mapping of the I_MESSAGE, the private communication session key, and the UID key of the first UE in a storage; receiving, by the second UE, the private communication session initiation request including the SIP INVITE with the I_MESSAGE in the SDP from the first UE for the at least one subsequent private communication session; and reusing, by the second UE), the stored private communication session key for the at least one subsequent private communication.

According to an embodiment, the reusing, by the second UE), the stored private communication session key for the at least one subsequent private communication may include: checking whether the I_MESSAGE exists for the first UE using the stored mapping of the I_MESSAGE, the private communication session key, and the UID key of the first UE, on receiving the I_MESSAGE from the first UE for the at least one subsequent private communication session; determining whether the received I_MESSAGE matches with the stored I_MESSAGE, if the stored I_MESSAGE exists for the first UE; fetching the private communication session key associated with the I_MESSAGE that exists for the first UE from the stored mapping of the I_MESSAGE, the private communication session key, and the UID key of the first UE; and reusing the fetched private communication session key for the at least one subsequent private communization session initiated by the first UE.

According to an embodiment, the method may further include reuse, by the second UE, the fetched private communication session key to decrypt the private communication packets received from the first UE during the initiated at least one subsequent private communization session.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1A:
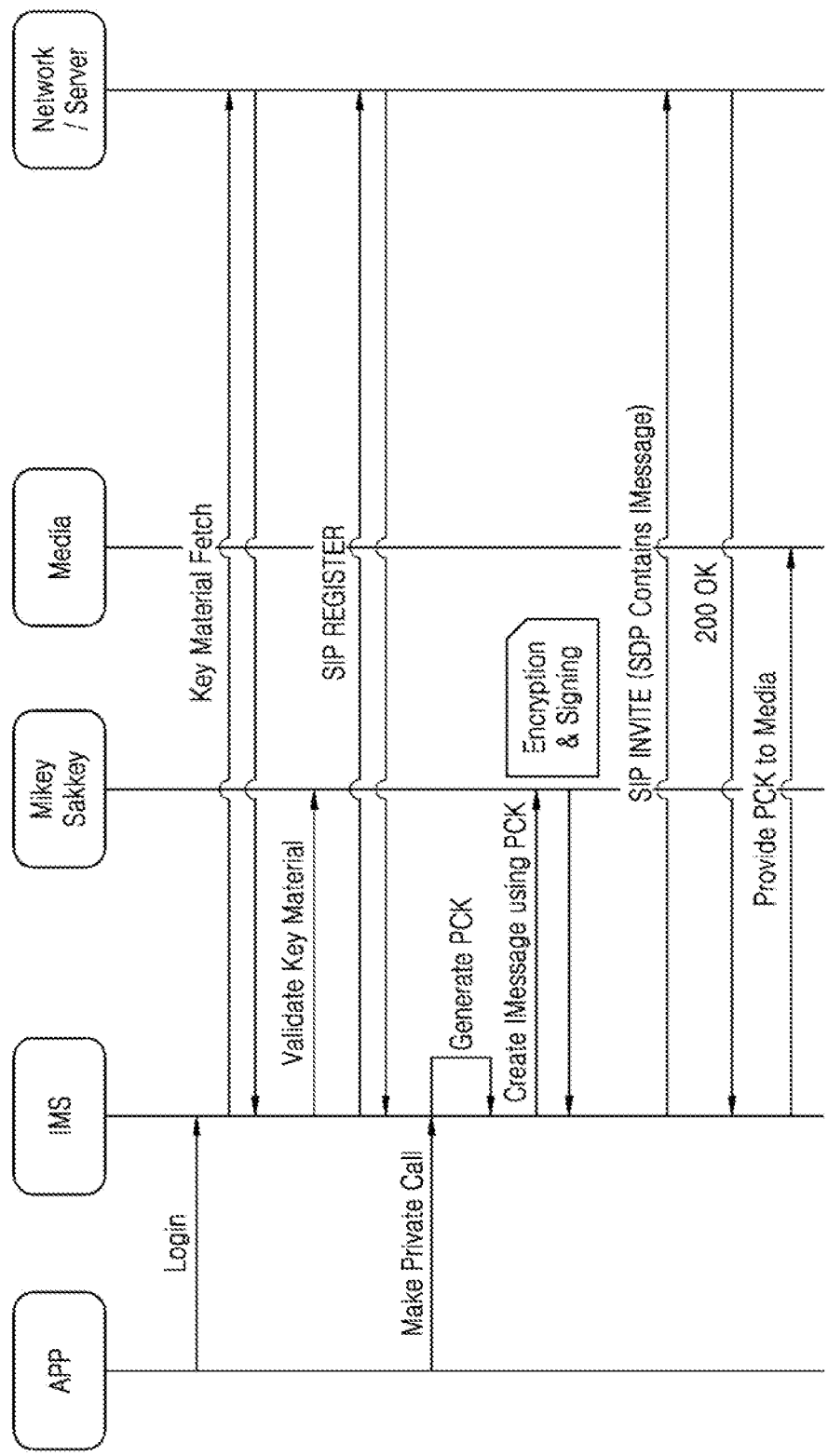
FIGS. 1A and 1B are example sequence diagrams depicting conventional methods of initiating a private communication session using Mission Critical (MC) services.

The embodiments provided herein and the various features and advantageous details thereof are explained more fully with reference to the accompanying drawings. Descriptions of well-known components and processing techniques are omitted so as to not unnecessarily obscure the embodiments herein. The description herein is intended merely to facilitate an understanding of ways in which the embodiments herein can be practiced and to further enable those of skill in the art to practice the embodiments herein. Accordingly, this disclosure should not be construed as limiting the scope of the embodiments herein. It is understood here that all of the embodiment provided herein are example embodiments, and thus, the inventive concept is not limited thereto and may be realized in various other forms.

Embodiments herein disclose methods and systems for initiating a private communication session using Mission Critical (MC) services.

Referring now to the drawings, and more particularly to FIGS. 2 through 8, where similar reference characters denote corresponding features consistently throughout the figures, there are shown example embodiments.

Mission Critical (MC) services (for example; Mission-critical push-to-talk (MCPTT) services, MC video (MCVideo) services, MC data (MCData) services, and so on) enable a User Equipment (UE) to initiate at least one private communication session with another UE. Examples of the private communication session may include, but not limited to, private voice calls, private data sessions, private video sessions, and so on. The private communication session has to be secure, and require a fast initiation time.

Figure 1B:
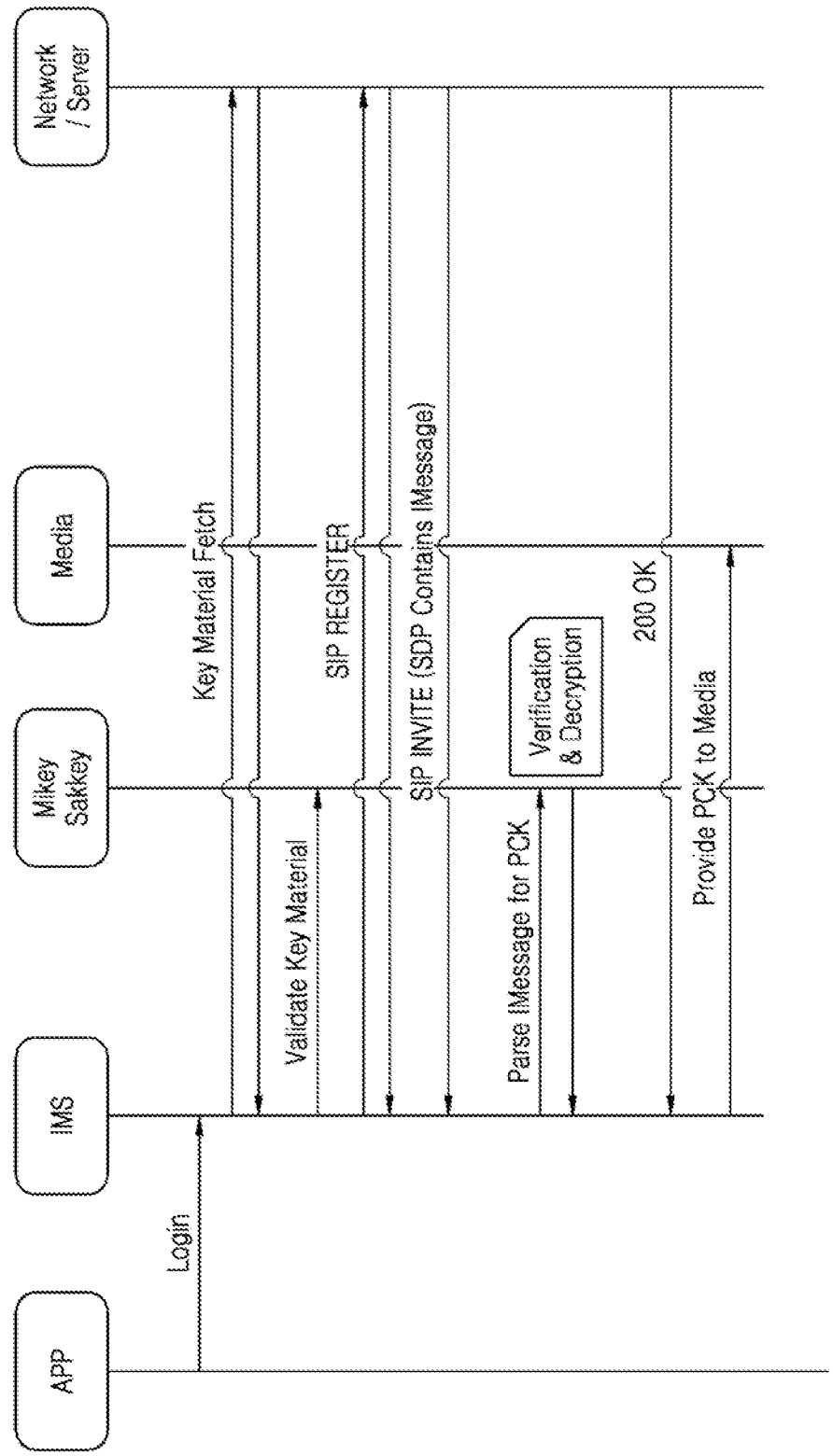

FIGS. 1A and 1B are example sequence diagrams depicting conventional methods of initiating a private communication session using MC services. In an example herein consider that, a UE initiates a private voice call (which can be considered to be an example of the private communication session) with at least one other UE using MCPTT services. The UE initiating the private voice call is referred hereinafter as an initiating UE, and the at least one other UE at which the initiated private voice call terminates is referred hereinafter as a terminating UE.

Prior to initiating the private voice call, the initiating UE and the terminating UE receive a key material from an MC server. The key material includes a user signing key, a user decryption key for signing and encrypting/decrypting of a Unique Identifier (UID) key of the initiating UE, and the UID key of the terminating UE. On receiving the key material, the initiating UE registers with the MC server, when initiating the private call with the terminating UE. In an example, the initiating UE may use a Session Initiation Protocol (SIP) registration method for registering with the MC server.

As depicted in FIG. 1A, on successful registering with the MC server, when a private communication (for example: the private voice call) is initiated, the initiating UE generates a Private Call Key (PCK) and securely transfers PCK key, along with a key identifier (PCK-ID), to the terminating UE. The PCK is encrypted to the user identity (UID) associated to the terminating UE. On creating the PCK, the initiator generates a 32-bit PCK Identifier (PCK-ID). The four (4) most significant bits of the PCK-ID shall indicate the purpose of the PCK is to protect the private call communications, the other 28-bits shall be randomly generated. The payload is signed using the user identity (UID) of the initiating UE. This payload is a MIKEY-SAKKE I_MESSAGE, as defined in IETF RFC 6509, which ensures the confidentiality, integrity and authenticity of the payload. The I_MESSAGE is sent in SIP INVITE request SDP content.

As depicted in FIG. 1B, the terminating UE decodes the I_MESSAGE received in SIP INVITE SDP content to obtain the PCK for the initiated private call. In an example herein, the terminating UE uses the MIKEY_SAKKEY protocol to decode the I_MESSAGE. For decoding the I_MESSAGE, the terminating UE validates the signature included in the I_MESSAGE using the UID key of the initiating UE. Once the signature has been validated successfully, the terminating UE extracts and decrypts the encapsulated PCK using its UID Key and also extracts the PCK-ID. On decrypting the PCK and PCK-ID at the terminating UE, the initiating and terminating UEs may use the SRTP/SRTCP keys generated from the PCK to create an end-to-end secure private session.

However, in the conventional methods, the initiating UE has to create the I_MESSAGE by encrypting the PCK, and the terminating UE has to decode the I_MESSAGE to decrypt the PCK for initiating each and every private voice call/private communication session. Encryption and decryption performed for each and every private voice call may increase the initiation time. In an example, encryption and decryption performed for each private voice call may require 50% of the call initiation time (which is approximately 500-600 milliseconds (ms)).

Figure 2:
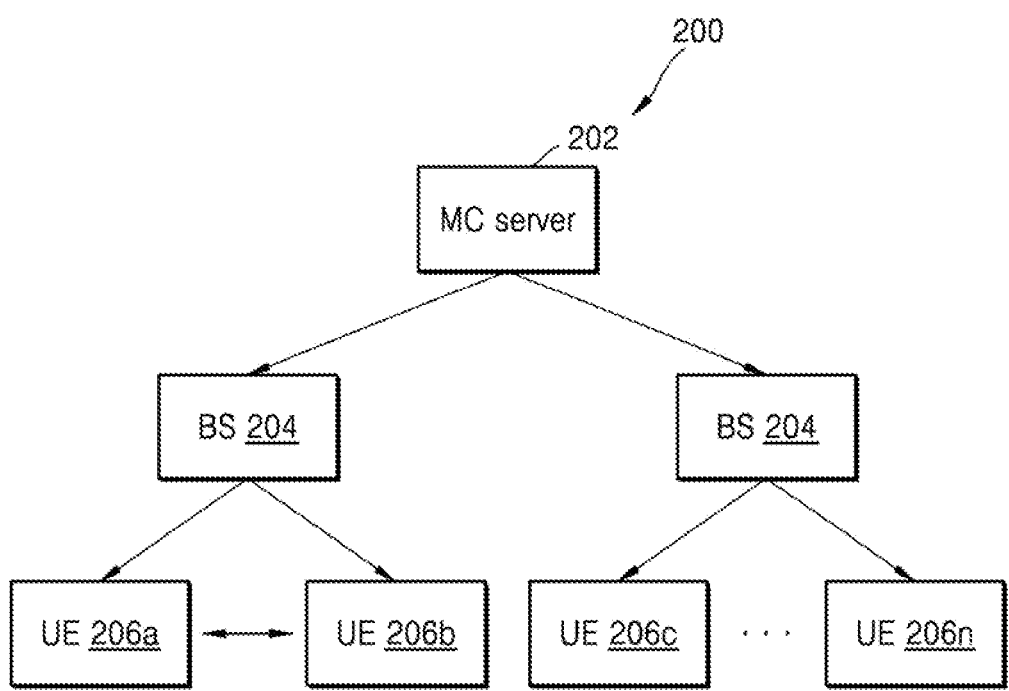
FIG. 2 depicts a communication system, according to embodiments as disclosed herein.

FIG. 2 depicts a communication system 200, according to embodiments as disclosed herein. The communication system 200 as referred herein can be configured to provide Mission Critical (MC) services to User Equipments (UEs)/terminals over a data network using radio access technologies (RATs). The data network may be at least one of an Internet Protocol (IP) based network or the like. Examples of the MC services may include, but not limited to, public safety applications, conferencing applications, collaboration applications, and so on. Examples of the RATs may include, but not limited to, a Third Generation Partnership Project (3GPP) 3rd Generation (3G), an Long Term Evolution (LTE/4G) network, an LTE-Advanced (LTE-A) network, a Fifth Generation (5G) New Radio (NR) network, a Wireless Local Area Network (WLAN), a Worldwide Interoperability for Microwave Access (WiMAX/IEEE 802.16), Wi-Fi (IEEE 802.11), an Evolved-UTRA (E-UTRA), an LTE/4G communication system, a 5G/NR communication system, or any other next generation networks. Embodiments herein use the terms "communication system", "MC system", "public safety system", and so on, interchangeably to refer to a system that provides MC services to one or more terminals.

The communication system 200 includes an MC server 202, at least one Base Station (BS) 204, and a plurality of User Equipments (UEs) 206a-206n.

The MC server 202 may be configured to provide the MC services to the UEs 206a-206n present in at least one serving area. The MC services referred herein can be the broadband trunking standard defined in 3GPP Release 13/14/15. The MC services include Mission-critical push-to-talk (MCPTT) services (MCPTT), MC video (MCVideo) services and MC data (MCData) services. Examples of the MC services may include, but not limited to, system management services, voice services, video services, data services, and so on. The MC services also support private communication sessions, so that the UEs 206a-206n can use the MC services to initiate private communication sessions with each other. Examples of the private communication sessions may include, but not limited to, private voice calls, private data sessions, private video sessions, and so on. In an example, the UEs 206a-206n may use the MCPTT services to initiate private voice calls with each other. In an example, the UEs 206a-206n may use the MCData services to initiate the private data sessions with each other. In an example, the UEs 206a-206n may use the MCVideo sessions to initiate the private video sessions with each other.

The MC server 202 can also be configured to generate key material which includes a user signing key and a user decryption key for the UEs 206a-206n in order to initiate the private communication sessions with each other using the MC services. The MC server 202 provides the key material for the UEs 206a-206n by authorization the UEs 206a-206n, when the UEs 206a-2026n register/subscribe with the MC server 202 for the MC services. The MC server 202 may provide the key material for the UEs 206a-206n according to 3GPP specification Release 13 (33.179). The MC server 202 may also periodically update the key material of the UEs 206a-206n, in order to ensure that the UEs 206a-206n are regularly authorized and the UEs that are no longer part of the MC services are removed from the communication system 200.

The MC server 202 may provide the MC services to the UEs 206 through the at least one BS 204. The BS/Radio Access Network (RAN) 204 may be configured to provide the MC services received from the MC server 202 to the registered UEs 206a-206n. The BS 204 may include nodes such as, but not limited to, evolved nodes (eNBs), New Radio nodes (gNBs), and so on. The BS 204 may communicate with the UEs 206a-206n via same or different RATS. Further, the BS 204 may be connected with a Core Network (not shown), which creates bearers for routing data/traffic between a particular gateway in the Core Network and the UEs 206. Examples of the data referred herein include, but not limited to, text messages, media (for example; audio, video, images, data packets, Internet Protocol (IP) packets and so on), sensor data, and so on.

The UEs 206a-206n may be user devices that support the MC services. Examples of the UEs 206a-206n may include, but not limited to, a mobile phone, a smartphone, a tablet, a phablet, a personal digital assistant (PDA), a laptop, a computer, a wearable computing device, a walkie-talkie/handheld transceiver, a vehicle infotainment device, an Internet of Things (IoT) device, or any other device that supports the MC services. The UEs 206a-206n may be configured to register with the MC server 202 for receiving and using the MC services (MCPTT services, MCVideo services and MCData services). The UEs 206a-206n may receive the MC services from the MC server 202 through the at least one BS 204.

A UE (for example, UE 206a) of the plurality of UEs 206a-206n may be configured to initiate the private communication session(s) (private voice calls/private MC data sessions/private MC video sessions) with at least one other UE (for example, at least one UE from UEs 206b-206n). In an embodiment, the UE 206a, which initiates the private communication session, may be referred hereinafter as "initiating UE", "first UE", "Mobile Originated (MO) side", and so on interchangeably through the disclosure. The at least one other UE, at which the private communication session terminates or the at least one other UE 206b which receives the private communication session (for example: the UE 206b) may be referred hereinafter as "terminating UE", "second UE", "Mobile Terminated (MT) side", and so on interchangeably through the disclosure.

Prior to initiating the private communication session, the initiating UE 206a and the terminating UE 206b fetch a key material from the MC server 202. The key material may include a user signing key and a user decrypting key to encrypt/decrypt and sign unique identifier (UIDs). The initiating UE 206a further validates the received key material and requests the MC server 202 to authorize the initiating UE 206a for initiating the private communication session with the terminating UE 206b. Once the initiating UE 206a is authorized, the initiating UE 206a initiates the private communication session with the terminating UE 206b.

For initialing the private communication session with the terminating UE 206b, the initiating UE 206a may create an I_MESSAGE for the terminating UE 206b. In an embodiment, the initiating UE 206a uses a Sakai-Kasahara Key Encryption in Multimedia Internet Keying (MIKEY_SAKKEY) protocol/encryption method for creating the I_MESSAGE.

For creating the I_MESSAGE, the initiating UE 206a may generate a private communication session key. The private communication session key may be a pre-processed/Secure Real-Time Transport Protocol (SRTP) key, which may be used to create a security context for protecting the private communication session. In an example, the initiating UE 206a may generate a private call key (PCK), on initiating a private voice call with the terminating UE 206b using the MCPTT services. In an example, the initiating UE 206a may generate a private data key, on initiating a private data session with the terminating UE 206b using the MCData services. In an example, the initiating UE 206a may generate a private video key, on initiating a private video session with the terminating UE 206b using the MCVideo services. Embodiments herein use the terms such as "private communication session key", "PCK", "private data key", "private video key", "private session key", and so on interchangeably to refer to a key that can be used to protect the private communication session.

On generating the private communication session key, the initiating UE 206a may encrypt the private communication session key using the UID key of the terminating UE 206b. The initiating UE 206a may then encapsulate the private communication session key and generate a private communication session key identifier (PCK-ID) for the private communication session key. The private communication session key identifier can be a 32-bit number that indicates a purpose of the private communication session key (i.e. to protect the private communication session). The four (4) most significant bits of the PCK-ID may indicate the purpose of the PCK to protect Private call communications, and the other 28-bits may be randomly generated. The initiating UE 206a may then include the encapsulated private communication session key, the private communication session key identifier within a payload. The payload may include a MIKEY-SAKKE I_MESSAGE, as defined in IETF RFC 6509. The initiating UE 206a may add a signature to the payload using its UID key. The initiating UE 206a may further include the payload within a Session Description Protocol (SDP) private communication session request. The payload included in the SDP private communication session request may be the I_MESSAGE. Thus, the created I_MESSAGE may include the encapsulated private communication session key, private communication session key identifier, and the signature.

In an embodiment, on creating the I_MESSAGE for the terminating UE 206b, the initiating UE 206a may define a validity value/expiry value for the I_MESSAGE, within which the I_MESSAGE can be reused for initiating the subsequent private communication sessions with the terminating UE 206b. The validity value may indicate a defined duration/period of time after which the I_MESSAGE may no longer be valid or used by the initiating UE 206a for the subsequent private communication sessions with the terminating UE 206b. In an embodiment, the initiating UE 206a may define and vary the validity value for the I_MESSAGE based on factors such as, but not limited to, a number/frequency of private communication sessions initiated between the initiating UE 206a, and the terminating UE 206b, duration of the initiated private communication sessions, and so on. For example, the initiating UE 206a may define the validity value of a week, a fortnight, one month, or the like. In an example, if the initiating UE 206a is the dispatcher, the frequency may be high, and if a user of the initiating UE 206a and the terminating UE 206b are from a same MC, the priority may be high. In such cases, the initiating UE 206a may define a higher validity values. Once the validity value of the I_MESSAGE expires, the initiating UE may create a new I_MESSAGE with new validity value.

On defining the validity value for the I_MESSAGE, the initiating UE 206a may map the I_MESSAGE with the validity value, the UID key of the terminating UE 206b, and the private communication session key, and store the mapping of the I_MESSAGE, the validity value, the UID key of the terminating UE 206b, and the private communication session key. Therefore, the initiating UE 206a may be able to reuse the stored mapping of the I_MESSAGE, the validity value, the UID key of the terminating UE 206b, and the private communication session key for initiating the subsequent private communication sessions (instead of generating the private communication session key, and the I_MESSAGE) with the same terminating UE 206b, as long as the I_MESSAGE is still valid. In an embodiment, the initiating UE 206a may update the stored mapping of the I_MESSAGE, the validity value, the UID key of the terminating UE 206b, and the private communication session key by removing the I_MESSAGE, and the private communication session key, on an expiry of the I_MESSAGE, and the key material received from the MC server 202.

Once the mapping of the I_MESSAGE, the validity value, the UID key of the terminating UE 206b, and the private communication session key have been stored, the initiating UE 206a may send the private communication session request including the I_MESSAGE to the terminating UE 206b through the at least one MC server 202.

On receiving the I_MESSAGE from the initiating UE 206a, the terminating UE 206b may decode/parse the I_MESSAGE by validating the signature included in the I_MESSAGE. Validating the signature involves comparing the signature included in the I_MESSAGE with the UID key of the initiating UE 206a (the UID key is generated by a hash combination of MC ID, a Uniform Resource Identifier (URI) of a key management Server and the validity time/value). Based on a successful validation, the terminating UE 206b may decrypt the encrypted private communication session key using the UID key of the initiating UE 206a to obtain the private communication session key. In an embodiment, the terminating UE 206b may use the MIKEY-SAKKEY protocol to decrypt the private communication session key.

On decrypting the PCK at the terminating UE 206b, the initiating and terminating UEs 206a and 206b may use Secure Real-time Transport Protocol (SRTP)/an extension of the SRTP (SRTCP)/private communication session key to create an end-to-end secure private communication session. In an embodiment, on decrypting the private communication session key, the terminating UE 206b may map the obtained private communication session key with the received I_MESSAGE and the UID key of the initiating UE 206a, and store the mapping of the private communication session key with the I_MESSAGE, and the UID key of the initiating UE 206a. The terminating UE 206b may reuse the stored private communication session key for the subsequent private communication sessions with the initiating UE 206a (instead of decrypting the private communication session key).

In an embodiment, the initiating UE 206a may also be configured to initiate the subsequent private communication session with the terminating UE 206b by reusing the stored I_MESSAGE, and the private communication session. On initiating the subsequent private communication session with the terminating UE 206b, the initiating UE 206a may check the stored mapping of the I_MESSAGE, the validity value, the UID key of the terminating UE 206b, and the private communication session key to determine whether the I_MESSAGE exists for the UID key of the terminating UE 206a. If the I_MESSAGE exists for the UID key of the terminating UE 206b, the initiating UE 206a may determine the validity value of the I_MESSAGE. If the I_MESSAGE is not valid, the initiating UE 206a may create the I_MESSAGE. For creating the I_MESSAGE, the initiating UE 206a may generate and encrypt the private communication session key. The initiating UE 206a may further encapsulate the encrypted private communication session key, and generate the private communication session key identifier. The initiating UE 206a may then add the encapsulated private communication session key, and the private communication session key identifier in the payload, and add the signature to the payload. The payload may include the I_MESSAGE.

If the I_MESSAGE is valid, the initiating UE 206a may reuse the I_MESSAGE and the associated private communication session key for initiating the subsequent private communication session with the terminating UE 206b. The initiating UE 206a may fetch the I_MESSAGE matching with the UID key of the terminating UE 206b from the mapping of the I_MESSAGE, the validity value, the UID key of the terminating UE 206b, and the private communication session key. The initiating UE 206b may then send the fetched I_MESSAGE to the terminating UE 206b for initiating the subsequent private communication session.

In an embodiment, on receiving the I_MESSAGE from the initiating UE 206a, the terminating UE 206b may check the stored mapping of the private communication session key, the I_MESSAGE, and the UID key of the initiating UE 206a to determine whether the received I_MESSAGE exists in the stored mapping for the initiated UE 206a (from which the I_MESSAGE is received). If the received I_MESSAGE does not exist in the mapping for the initiated UE 206*a*, the terminating UE 206*b* may validate the received I_MESSAGE, and decrypt the I_MESSAGE to obtain the private communication session key. If the received I_MESSAGE exists in the stored mapping for the initiated UE 206*a*, the terminating UE 206*b* may fetch the private communication session key associated with the corresponding I_MESSAGE from the stored mapping of the private communication session key, the I_MESSAGE, and the UID key of the initiating UE 206*a*. Thereafter, the initiating UE 206*a*, and the terminating UE 206*b* may use the private communication session key/SRTP to create the secure end-to-end communication session.

Thus, reusing of the I_MESSAGE/PCK may eliminate a requirement of creating the I_MESSAGE by encrypting the private communication session key at the initiating UE 206*a* and decrypting the private communication session key by decoding the I_MESSAGE at the terminating UE 206*b* for each and every private communication session, which further reduces private communication session initiation time.

FIG. 2 shows exemplary elements of the communication system 200, but it is to be understood that other embodiments are not limited thereon. In other embodiments, the communication system 200 may include less or more number of elements. Further, the labels or names of the elements are used only for illustrative purpose and does not limit the scope of the embodiments herein. One or more elements may be combined together to perform same or substantially similar function in the communication system 200.

Figure 3:
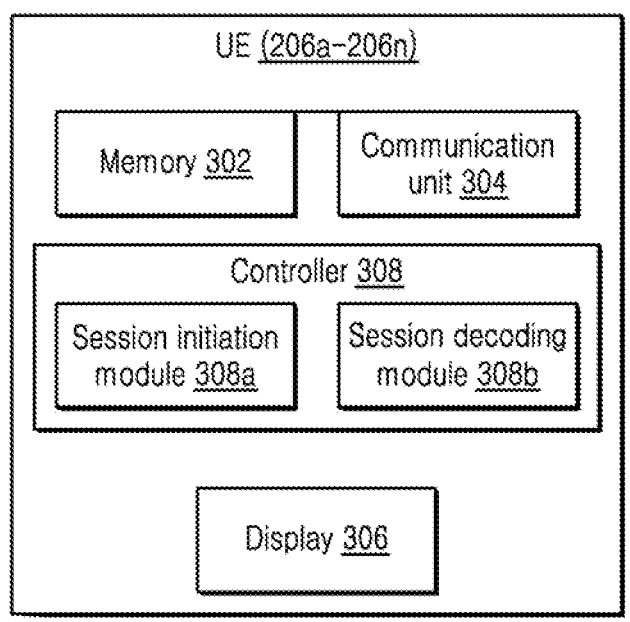
FIG. 3 is a block diagram depicting various components of the UE for creating an I_MESSAGE, or parsing the I_MESSAGE while initiating the private communication session using the MC services, according to embodiments as disclosed herein.

FIG. 3 is a block diagram depicting various components of the UE (206*a*-206*n*) for creating the I_MESSAGE, or parsing the I_MESSAGE while initiating the private communication session using the MC services, according to embodiments as disclosed herein.

The UE (for example; the UE 206*a*, which can be the initiating UE or the terminating UE) includes a storage 302, a communication unit 304, a display 306, and a controller 308. The UE 206*a* may also include a transceiver, a processing circuitry, an Input/Output (I/O) module, and so on (not shown). According to an embodiment, the transceiver may include any one or any combination of a digital modem, a radio frequency (RF) modem, a WiFi chip, and/or related software and/or firmware.

The storage 302 can store at least one of the key material fetched from the MC server 202, the private communication session key, the private communication session key identifier, the I_MESSAGE, the mapping of the I_MESSAGE, the validity value, the UID key of the terminating UE, and the private communication session key, and so on, the mapping of the private communication session key, the I_MESSAGE, and the UID key of the initiating UE, and so on. The storage 302 may be at least one of, but not limited to, a database, a file server, a cloud storage, a memory, and so on. Examples of the memory may include, but not limited to, NAND, embedded Multi Media Card (eMMC), Secure Digital (SD) cards, Universal Serial Bus (USB), Serial Advanced Technology Attachment (SATA), solid-state drive (SSD), and so on. Further, the memory may include one or more computer-readable storage media. The memory may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication unit 304 may be configured to enable the UE 206*a* to communicate with at least one external entity (the at least one other UE (206*b*-206*n*), the MC server 202, the BS 204, or the like) using an interface supported by the at least one RAT. Examples of the interface may include, but not limited to, a wired interface, a wireless interface (for example: an air interface, an Nu interface, or the like), a wireless fronthaul interface, a wired or wireless backhaul interface, or any structure supporting communications over a wired or wireless connection.

The display 306 may be configured to enable the user to interact with the UE 206*a*. The display 306 allows the user to select the at least one other/terminating UE (206*b*-206*n*) for initiating the private communication session.

The controller 308 may include at least one of a single processer, a plurality of processors, multiple homogeneous or heterogeneous cores, multiple Central Processing Units (CPUs) of different kinds, microcontrollers, special media, and other accelerators.

In an embodiment, the controller 308 may be configured to create the I_MESSAGE with the validity value for initiating a first private communication session between the UE 206*a* and the at least one other UE (206*b*-206*n*). In an embodiment, the controller 308 may be configured to reuse the created I_MESSAGE based on the validity value of the created I_MESSAGE for initiating the subsequent private communication sessions between the UE 206*a*, and the at least one other UE (206*b*-206*n*).

In an embodiment, the controller 308 may be configured to decode the I_MESSAGE for obtaining the private communication session key, on receiving the private communication session initiation request from the at least one other UE (206*b*-206*n*) for the first private communication session. In an embodiment, the controller 308 may reuse the obtained private communication session key (instead of decrypting), on receiving the private communication session initiation requests from the at least one same other UE (206*b*-206*n*) for the subsequent private communication sessions.

The controller 308 may include a session initiation module 308*a*, and a session decoding module 308*b*. The session initiation module 308*a* may operate, when the UE 206*a* is the initiating UE (i.e., when the UE 206*a* initiates the private communication session with the at least one other UE 206*a*).

The session initiation module 308*a* may be configured to create the I_MESSAGE and store the I_MESSAGE in the storage 302, on initiating the first private communication session by the UE 206*a* with the at least one other UE/terminating UE (for example, the UE 206*b*). The session initiation module 308*a* may fetch the key material from the MC server 202 prior to the initiation of the private communication session. The key material may include the UID key of the UE 206*a*, and the UID key of the terminating UE 206*b*. The session initiation module 308*a* may validate the key material. On successful validation of the key material, the key session initiation module 308*a* may store the received key material in the storage 302. The session initiation module 302 may also update the key material in the storage 302 due to at least one of the expiry of the key material, updating of the key material by the MC server 202, and so on.

The session initiation module 308a may further enable the UE 206a to register with the MC server 202 for initiating the private communication session with the terminating UE 206b. In an embodiment, the session initiation module 308a may enable the UE 206a to use a Session Initiation Protocol (SIP) registration method for registering with the MC server 202.

On registering with the MC server 202, the session initiation module 308a may enable the UE 206a for initiating the private communication session with the terminating UE 206b. For initiating the private communication session with the terminating UE 206b, the session initiation module 308a may create the I_MESSAGE for the terminating UE 206b. The I_MESSAGE may be a payload that is used to distribute the private communication session key of the UE 206a to the terminating UE 206b. In an embodiment, the session initiation module 308a may use at least one encryption method/protocol such as, but not limited to, the MIKEY_SAKKEY protocol, or the like for creating the I_MESSAGE. Embodiments herein are further explained considering the MIKEY_SAKKEY protocol as an example for creating the I_MESSAGE, but it may be obvious to a person skilled in the art that any other encryption methods/protocols may be used for creating the I_MESSAGE.

For creating the I_MESSAGE, the session initiation module 308a may generate the private communication session key using the RFC 6507 ECCSI standard. The session initiation module 308a may then encrypt the private communication session key using the UID key of the terminating UE 206b. In an embodiment, the session initiation module 308a may encrypt the private communication session key based on the RFC 6509 standard. The session initiation module 308a may encapsulate the encrypted private communication session key, and generate the private communication session key identifier. The private communication session key identifier may be a 32-bit key identifier, wherein 4 most significant bits of the private communication session key identifier indicates a purpose of the private communication session (that is to protect the private communication session), and other 28 bits of the private communication session key identifier may be randomly generated.

The session initiation module 308a may further add the encapsulated private communication session key, the private communication session key identifier, and the signature within a MIKEY payload within the SDP content of the private communication session request. The signature may be the UID key of the UE 206a. The MIKEY payload may include the I_MESSAGE. Thus, the I_MESSAGE may include the encapsulated encrypted private communication key, the private communication session key identifier, and the signature.

In an embodiment, on creating the I_MESSAGE, the session initiation module 308a may defines the validity value for the I_MESSAGE. The validity value may be a customizable pre-defined time period (for example, a week, a fortnight, one month, and so on). In an example, the validity value may be defined based on requirements of user (operators or customers) associated with the communication system 200. Once the I_MESSAGE expires, the session initiation module 308a may define the new validity value for the I_MESSAGE.

The session initiation module 308a may further map the I_MESSAGE with the validity value, the UID key of the terminating UE 206b, and the private communication session key. The session initiation module 308a may store the mapping of the I_MESSAGE, the validity value, the UID key of the terminating UE 206b, and the private communication session key in the storage 302.

The session initiation module 308a thereafter may send the created I_MESSAGE to the MC server 202 for obtaining an authorization to send the I_MESSAGE to the terminating UE 206b. In an embodiment, the session initiation module 308a may send the created I_MESSAGE to the MC server 202 in a Session Initiation Protocol (SIP) invite message. The session initiation module 308a may receive an acknowledgement from the MC server 202 indicating a successful authorization. On receiving the acknowledgment from the MC server 202, the session initiation module 308a may enable the UE 206a to send the created I_MESSAGE to the terminating UE 206b over the private communication session initiation request for the private communication session.

On decoding the I_MESSAGE at the terminating UE 206b, the session initiation module 308a may receive an acknowledgement/private communication session initiation response indicating a successful decoding of the I_MESSAGE from the terminating UE 206b. On receiving the acknowledgement from the terminating UE 206b, the session initiation module 308a may use the generated private communication session key/SRTP key to encrypt communication packets (voice packets, data packets, video packets, and so on) related to the initiated private communication session with the terminating UE 206. The session initiation module 308a may then enable the UE 206a to send data including the encrypted communication session packets to the terminating UE 206. Thus, a secure end-to-end private communication session with the terminating UE 206b may be created.

The session initiation module 308a may also be configured to enable the UE 206a to reuse the created I_MESSAGE for initiating the subsequent private communication sessions with the terminating UE 206b. On initiating the at least one subsequent private communication session with the terminating UE 206b, the session initiation module 308a may access the mapping of the I_MESSAGE, the validity value, the UID key of the terminating UE 206b, and the private communication session key stored in the storage 302, and check whether the I_MESSAGE exists in the mapping for the UID key of the terminating UE 206b with which the subsequent private communication session has been initiated. If the I_MESSAGE does not exist in the stored mapping, the session initiation module 308a may create the I_MESSAGE by generating the private communication session key, encapsulating the private communication session key, and adding the private communication session key identifier and the signature to the encapsulated private communication session key.

If the I_MESSAGE exists for the UID key of the terminating UE 206b, the session initiation module 308a my check for the validity value mapped with the I_MESSAGE in the stored mapping. If the I_MESSAGE has expired, the session initiation module 308a may create the I_MESSAGE for the initiated subsequent private communication session. If the I_MESSAGE is valid, the session initiation module 308a may fetch the corresponding I_MESSAGE from the mapping stored in the storage 302, and reuse the fetched I_MESSAGE to initiate the private communication session with the terminating UE 206b.

The session initiation module 308a thereafter may send the fetched I_MESSAGE to the MC server 202 for obtaining the authorization to send the I_MESSAGE to the terminating UE 206b. On receiving the acknowledgment from the MC server 202 indicating the successful authorization, the session initiation module 308a may enable the UE 206a to send the fetched I_MESSAGE to the terminating UE 206b through the session initiation module 308a for initiating the subsequent private communication session. Thus, reusing the I_MESSAGE for the subsequent private communication sessions may avoid repeating the creation of the I_MESSAGE for each private communication session, which further aids in initiating the private communication session without delay.

The session decoding module 308b may operate, when the UE 206a is the terminating UE (i.e., the UE 206a, at which the private communication session initiated by the at least one other UE (206b-206n) terminates or the UE 206a, which receives the private communication session from the at least one other UE (206b-206n)). The session decoding module 308b may be configured to decode the I_MESSAGE, on receiving the private communication session initiation request including the I_MESSAGE from the initiating UE (for example; the UE 206b) for the first private communication session. The received I_MESSAGE includes the encapsulated private communication session key, the private communication session key identifier, and the signature.

In an embodiment, the session decoding module 308b may use at least one encryption method/protocol such as, but not limited to, the MIKEY_SAKKEY protocol, or the like for decoding/parsing the I_MESSAGE. Embodiments herein are further explained considering the MIKEY_SAKKEY protocol as an example of the protocol used for decoding the I_MESSAGE, but it may obvious to a person skilled in the art that any other encryption methods/protocols may be used for decoding the I_MESSAGE.

On receiving the I_MESSAGE from the initiating UE 206b, the session decoding module 308b may extract the signature from the I_MESSAGE, and validate the extracted signature. The session decoding module 308b may extract the signature by extracting an URI of the initiating UE 206a from an initiator field (IDRi) of the message and converting to the UID. The converted UID may be used to check the signature on the MIKEY-SAKEY I_MESSAGE. The session decoding module 308b may receive the UID key/key material of the initiating UE 206b from the MC server 202 prior to receiving the private communication session request from the initiating UE 206b. The session decoding module 308b may determine that the extracted signature is valid, if the UID key corresponding to the extracted signature matches with the UID key of the initiating UE 206b. The session decoding module 308b may determine that the extracted signature is invalid, if the UID key corresponding to the extracted signature does not match with the UID key of the initiating UE 206b.

Based on the validation of the signature, the session decoding module 308b may extract the private communication session key identifier. Thereafter, the session decoding module 308b may decrypt the encapsulated private communication session key included in the received I_MESSAGE using the UID key of the UE 206a to obtain the private communication session key generated by the initiating UE 206b. In an embodiment, the session decoding module 308b may decrypt the encapsulated private communication session key using the RFC 6509 standard.

In an embodiment, the session decoding module 308b may map the decrypted private communication session key with the received I_MESSAGE, and the UID key of the initiating UE 206b, and store the mapping of the I_MESSAGE, the private communication session key, and the UID key of the initiating UE in the storage 302. The session decoding module 308b may use the obtained private communication session key to create the end-to-end secure private communication session with the initiating UE 206b.

The session decoding module 308b may also be configured to reuse the stored private communication session key for the subsequent private communication sessions initiated by the same initiating UE 206b. The session decoding module 308b may receive the private communication session initiation request including the I_MESSAGE from the initiating UE 206b for the subsequent private communication session.

On receiving the I_MESSAGE, the session decoding module 308b may access the mapping of the I_MESSAGE, the private communication session key, and the UID key of the initiating UE 206b stored in the storage 302, and check if the received I_MESSAGE is present in the stored mapping for the initiating UE 206b. If the received I_MESSAGE is not present in the stored mapping, the session decoding module 308b may decode the I_MESSAGE to obtain the private communication session key for the initiating UE 206b.

If the received I_MESSAGE is present in the stored mapping for the initiating UE 206b, the session decoding module 308b may fetch the private communication session key mapped with the corresponding I_MESSAGE from the mapping of the I_MESSAGE, the private communication session key, and the UID key of the initiating UE stored in the storage 302. The session decoding module 308b may reuse the fetched private communication session key for creating the end-to-end secure subsequent private communication session with the initiating UE 206b. Thus, reusing the stored private communication session key for the subsequent private communication sessions may avoid repetition of the decoding of the I_MESSAGE for each private communication session, which further aids in initiating the private communication session without delay.

FIG. 3 shows exemplary units of the UE (206a-206n), but it is to be understood that other embodiments are not limited thereon. In other embodiments, the UE (206a-206n) may include less or more number of units. Further, the labels or names of the units are used only for illustrative purpose and does not limit the scope of the embodiments herein. One or more units may be combined together to perform same or substantially similar function in the UE (206a-206n).

Figure 4:
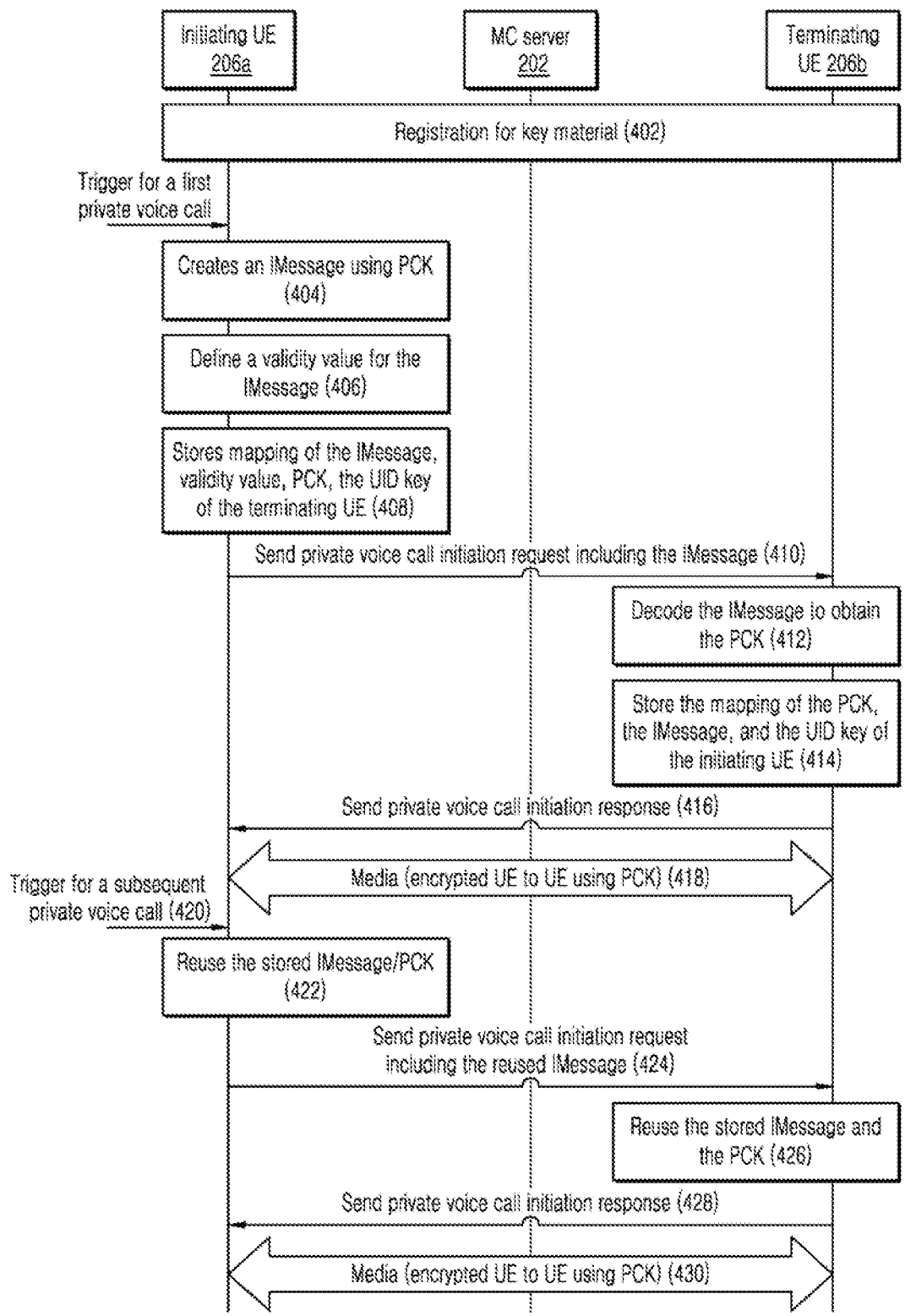
FIG. 4 is an example sequence diagram depicting the initiation of the private communication session using the MC services, according to embodiments as disclosed herein.

FIG. 4 is an example sequence diagram depicting the initiation of the private communication session using the MC services, according to embodiments as disclosed herein.

Embodiments herein are further explained by considering the MCPTT services as an example for the MC services and the private voice calls supported by the MCPTT services as an example of the private communication sessions, but it may be obvious to a person skilled in the art that any other MC services may be considered.

As depicted in FIG. 4, at step 402, the initiating UE 206a, and the terminating UE 206b fetch the key material from the MC server 202 prior to the initiation of a private voice call using the MCPTT services. The key material can include the user signing key and the user decryption key.

At step 404, for initiating a first private voice call with the terminating UE 206b, the initiating UE 206a creates the I_MESSAGE using the key material fetched from the MC server 202. Creating the I_MESSAGE involves generating a PCK (an example of the private communication session key), encrypting and encapsulating the PCK, and adding a PCK-identifier (PCK-ID, an example of the private communication session key identifier), and the signature to the encapsulated PCK. Thus, the created I_MESSAGE includes the encapsulated PCK, the PCK-ID, and the signature.

At step 406, the initiating UE 206a defines the validity value for the created I_MESSAGE. In an example herein, the UE initiating UE 206a defines the validity value of 15 days for the created I_MESSAGE. At step 408, the initiating UE 206a maps the created I_MESSAGE with the validity value, the UID key of the terminating UE 206b, and the PCK and stores the mapping of the I_MESSAGE, the validity value, the UID key of the terminating UE 206b, and the PCK in the storage 302. At step 410, the initiating UE 206a sends a private voice call initiation request including the I_MESSAGE to the terminating UE 206b through the MC server 202 for initiating the first private voice call.

At step 412, the terminating UE 206b decodes the received I_MESSAGE to obtain the PCK, on receiving the private call request including the I_MESSAGE from the initiating UE 206b. For decoding the I_MESSAGE, the UE 206b initially validates the signature including in the received I_MESSAGE. Based on the successful validation, the terminating UE 206b decrypts the encapsulated PCK using its UID key to obtain the PCK and the PCK-ID for the PCK. At step 414, the terminating UE 206b maps the decrypted PCK with the I_MESSAGE and the UID key of the initiating UE 206a, and stores the mapping of the PCK, the I_MESSAGE, and the UID key of the initiating UE 206a in the storage 302. At step 416, on decrypting the PCK, the terminating UE 206b sends a private voice call initiation response to the initiating UE 206a indicating the successful decryption of the PCK.

At step 418, data (for example, voice packets) are communicated between the UEs (206a, 206b), on the successful decryption of the PCK at the terminating UE 206b, wherein the data may be protected using the PCK.

At step 420, the initiating UE 206a initiates a subsequent private voice call with the same terminating UE 206b. In an example, consider that the UE 206a initiates the subsequent private voice call after 5 days of initiating the first private voice call. At step 422, the initiating UE 206a reuses the stored I_MESSAGE for the subsequent private voice call, which has been created for the terminating UE 206b. The initiating UE 206a reuses the stored I_MESSAGE by checking the validity value associated with the I_MESSAGE. In an example herein, the I_MESSAGE may be valid, as the I_MESSAGE is associated with the validity value of 15 days and the subsequent private voice call is initiated after 5 days of the first private voice call. At step 424, the initiating UE 206a fetches the I_MESSAGE created for the terminating UE 206b from the mapping of the I_MESSAGE, the validity value, the UID key of the terminating UE 206b, and the PCK stored in the storage 302 and sends the fetched I_MESSAGE to the terminating UE 206b through the MC server 202 over the private voice call initiation request.

At step 426, the terminating UE 206b reuses the stored I_MESSAGE and the decrypted PCK for the subsequent private call. On receiving the private voice call initiation request including the I_MESSAGE for the subsequent private voice call, the terminating UE 206b checks whether the received I_MESSAGE exists for the initiating UE 206a using the mapping of the I_MESSAGE, the PCK, and the UID key of the initiating UE 206a stored in the storage 302. If the received I_MESSAGE exists for the initiating UE 206a, the terminating UE 206a fetches the corresponding I_MESSAGE from the storage 302, and reuses the fetched I_MESSAGE for the subsequent private voice call.

At step 428, the terminating UE 206b sends the private voice call initiation response to the initiating UE 206a by reusing the stored I_MESSAGE, and the PCK for the subsequent private voice call.

At step 430, the media including subsequent voice packets are communicated between the UEs (206a, 206b), wherein the voice packets may be protected using the reused PCK.

Figure 5A:
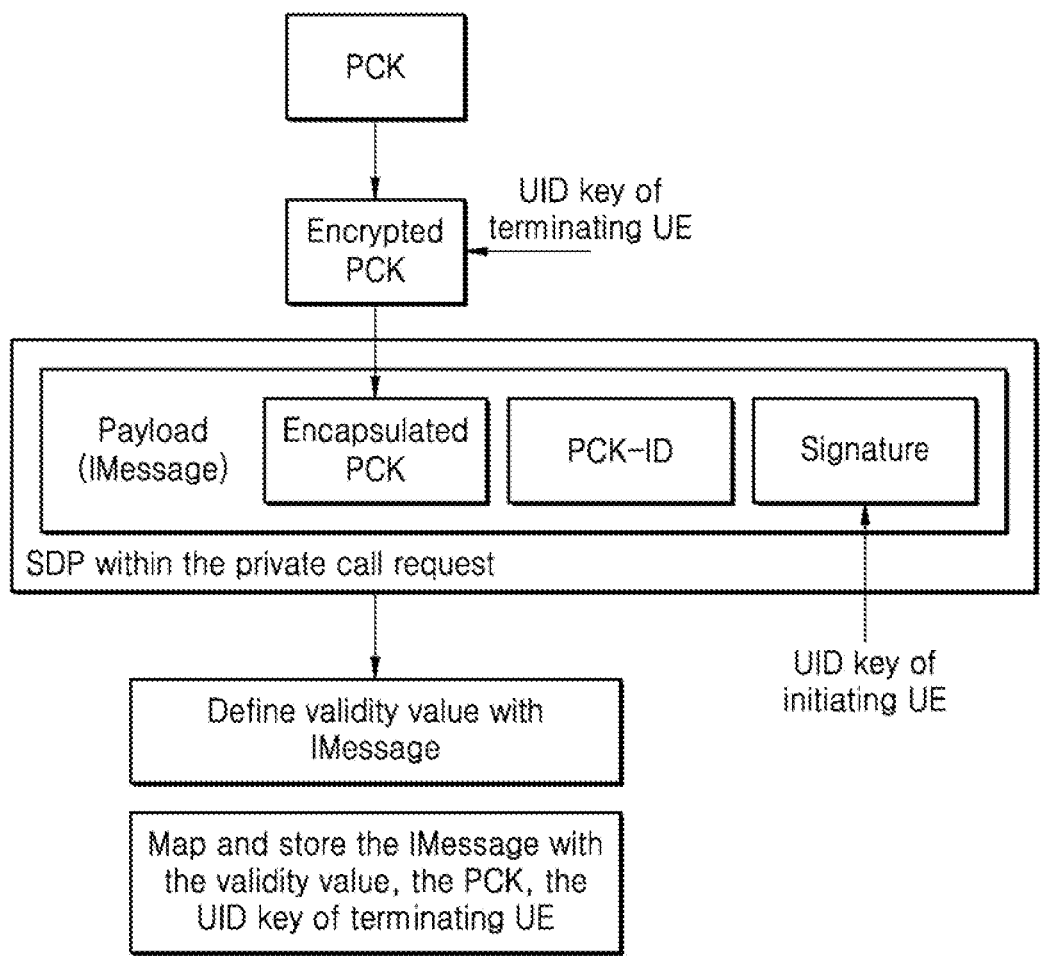
FIG. 5A is an example diagram depicting the creation of the I_MESSAGE, according to embodiments as disclosed herein.

FIG. 5A is an example diagram depicting the creation of the I_MESSAGE, according to embodiments as disclosed herein. Embodiments herein may enable the initiating UE 206a to create the I_MESSAGE using the MIKEY_SAKKEY protocol for initiating the private voice call with the terminating UE 206b.

For creating the I_MESSAGE, the initiating UE 206a generates the PCK based on the RFC 6507 ECCSI standard. On generating the PCK, the initiating UE 206a encrypts the PCK using the UID key of the terminating UE 206b. The PCK may be encrypted based on the RFC 6509 standard. Thereafter, the initiating UE 206a encapsulates the encrypted PCK, and generates the PCK-ID for the generated PCK. The initiating UE 206a includes the encapsulated PCK and the PCK-ID in the MIKEY payload and adds the signature to the MIKEY payload using its UID key. The initiating UE 206a further includes the MIKEY payload within the SDP content of the private call request. The MIKEY payload included within the SDP content of the private call request may be the I_MESSAGE, which ensures the confidentiality, integrity and authenticity of the PCK generated for the private voice call.

In an embodiment, after generating the I_MESSAGE, the initiating UE 206a defines the validity value for the I_MESSAGE. The initiating UE 206a further maps the I_MESSAGE with the validity value, the UID key of the terminating UE 206b, and the PCK, and stores the mapping of the I_MESSAGE, the validity value, the UID key of the terminating UE 206b, and the PCK in the storage 302.

Figure 5B:
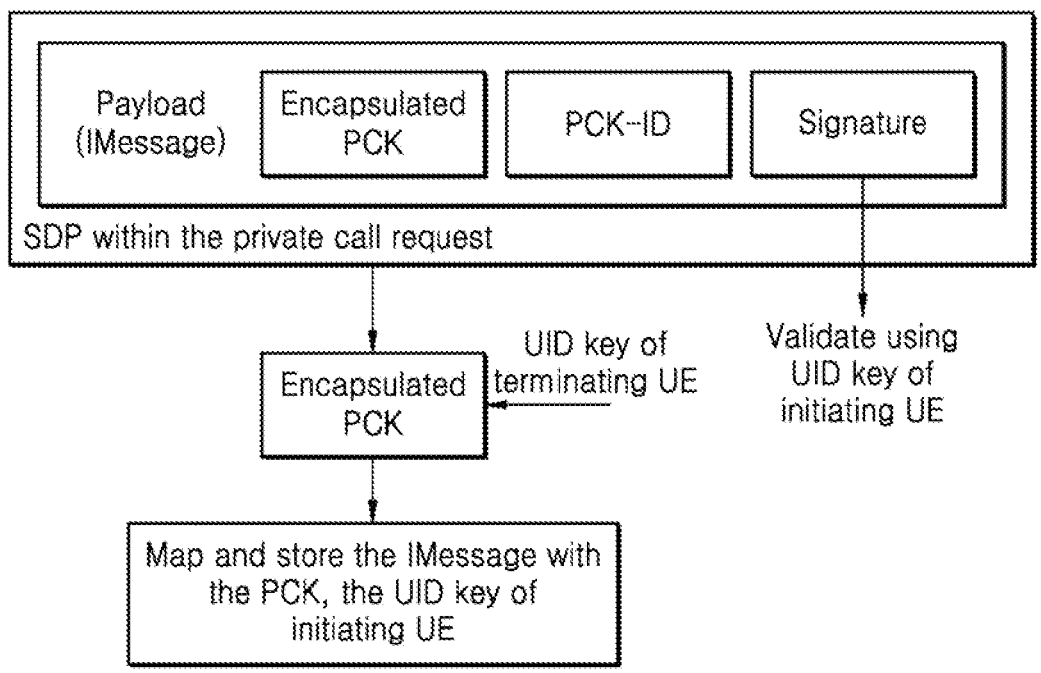
FIG. 5B is an example diagram depicting the decoding/parsing of the I_MESSAGE, according to embodiments as disclosed herein.

FIG. 5B is an example diagram depicting the decoding/parsing of the I_MESSAGE at the terminating UE 206b, according to embodiments as disclosed herein.

Embodiments herein may enable the terminating UE 206b to decode the I_MESSAGE using the MIKEY_SAKKEY protocol, on receiving the private call request including the I_MESSAGE for the private voice call. The received I_MESSAGE includes the encapsulated PCK, the PCK-ID, and the signature.

The terminating UE 206b validates the signature included in the I_MESSAGE. The terminating UE 206b converts the signature to the UID key, and compares the converted UID key with the UID key of the initiating UE 206a. The terminating UE 206b decrypts the encapsulated PCK, if the converted UID key matches with the UID key of the initiating UE 206a. The terminating UE 206b decrypts the encrypted PCK using its UID key, based on the RFC 6509. Thereafter, the terminating UE 206b decrypts the PCK-ID to know the purpose of the received PCK (i.e., to protect the initiated private voice call).

In an embodiment, the terminating UE 206b maps the received I_MESSAGE, the decrypted PCK, and stores the mapping of the received I_MESSAGE and the PCK in the storage 302. Therefore, the terminating UE 206b can reuse the PCK instead of decrypting the PCK for the subsequent private voice calls initiated by the initiating UE 206a.

Figure 6:
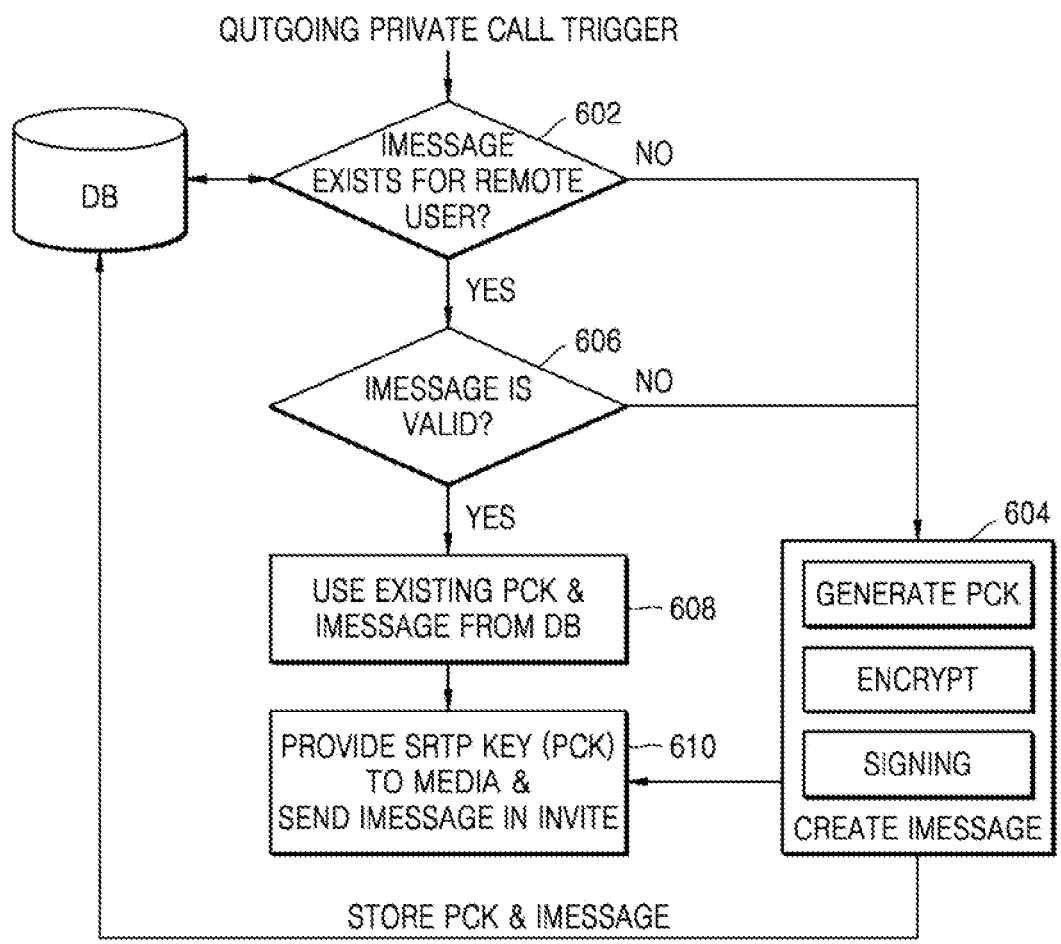
FIG. 6 is an example flow diagram depicting a method for reusing the I_MESSAGE for the subsequent private calls initiated for the same terminating UE, according to embodiments as disclosed herein.

FIG. 6 is an example flow diagram depicting a method for reusing the I_MESSAGE for the subsequent private calls initiated for the same terminating UE 206b, according to embodiments as disclosed herein.

At step 602, the initiating UE 206a determines whether the I_MESSAGE exists for the terminating UE 206b, on detecting a trigger initiated by the user for making the private voice call to the terminating UE 206b. The initiating UE 206a access the mapping of the I_MESSAGE, the validity value, the UID key of the terminating UE 206b, and the PCK from the storage/database (DB) 302, and checks whether the received I_MESSAGE exists in the stored mapping for the terminating UE 206b. If the received I_MESSAGE does not exist in the stored mapping, the initiating UE 206a at step 604 creates the I_MESSAGE. The initiating UE 206a creates the I_MESSAGE by generating the PCK, encrypting and encapsulating the PCK, adding the signature to the encapsulated PCK. The initiating UE 206a then stores the I_MESSAGE, and the PCK in the storage 302.

If the received I_MESSAGE exists in the stored mapping, at step 606, the initiating UE 206a determines the validity of the I_MESSAGE that exists for the terminating UE 206a, based on the validity value mapped with the corresponding I_MESSAGE. If the I_MESSAGE is not valid, at step 604, the initiating UE 206a creates the I_MESSAGE and stores the I_MESSAGE and the PCK in the storage 302.

If the I_MESSAGE is valid, at step 608, the initiating UE 206a fetches the I_MESSAGE that exists for the terminating UE 206b and the associated PCK from the storage 302 for initiating the private voice call with the terminated UE 206b.

At step 610, the initiating UE 206a sends the fetched/created I_MESSAGE to the MC server 202 over the SIP invite message to obtain the authorization for initiating the private voice call with the terminating UE 206b. On obtaining the authorization from the MC serer 202, the initiating UE 206a sends the private call initiation request including the I_MESSAGE to the terminating UE 206b for the private voice call. The initiating UE 206a may receive the private call initiation response from the termination UE 206a, when the terminating UE 206b decrypts the PCK from the received I_MESSAGE successfully. In response to the received response, the initiating UE 206a sends the voice packets that are encrypted using the PCK associated with the reused I_MESSAGE/created I_MESSAGE to the terminating UE 206b. Thereby, creating an end-to-end secure voice call session.

Figure 7:
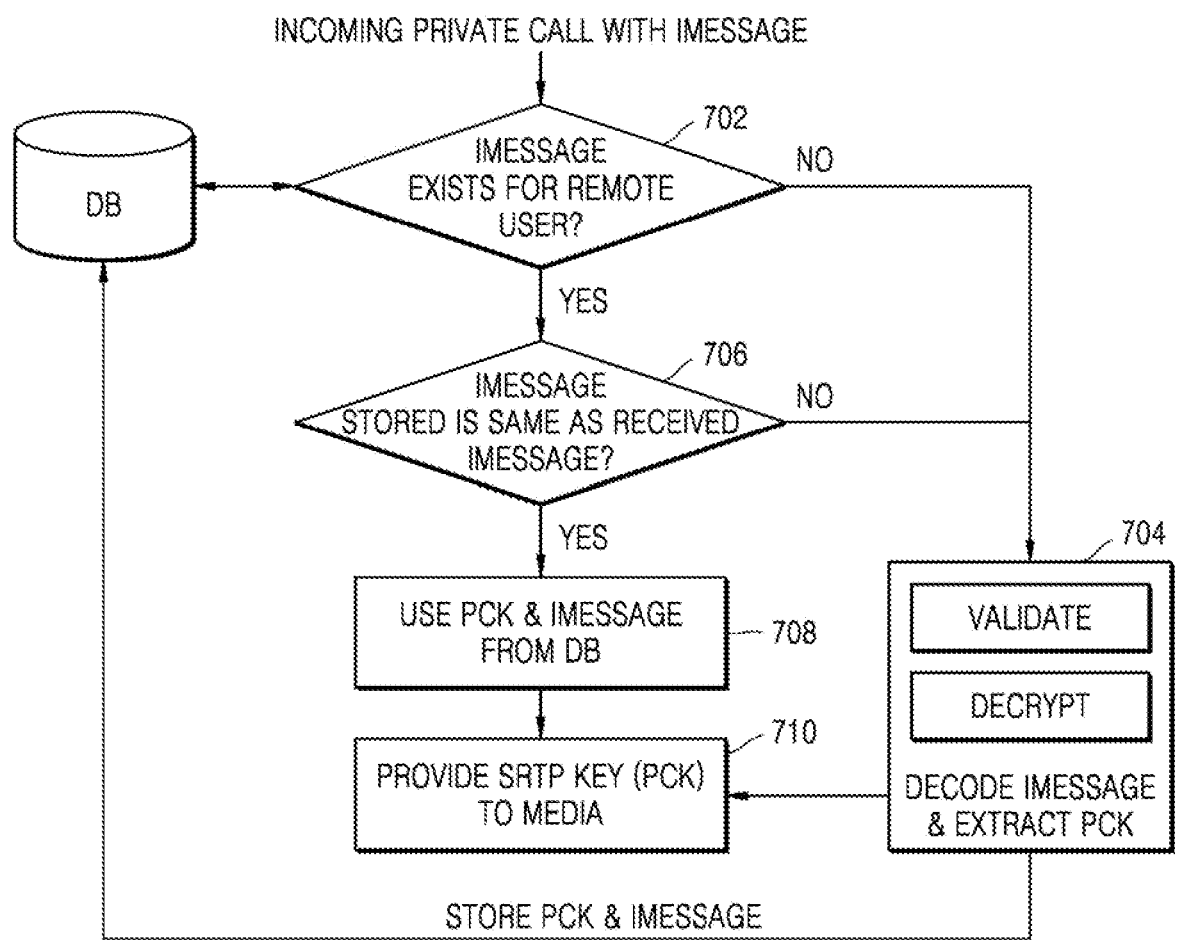
FIG. 7 is an example diagram depicting a method for reusing the I_MESSAGE and the PCK for the subsequent private calls received from the same initiating UE 206a, according to embodiments as disclosed herein.

FIG. 7 is an example diagram depicting a method for reusing the I_MESSAGE and the PCK for the subsequent private calls received from the same initiating UE 206a, according to embodiments as disclosed herein.

At step 702, the terminating UE 206b receives the private call initiation request including the I_MESSAGE from the initiating UE 206a and checks whether the received I_MESSAGE exists for the initiating UE 206a. The terminating UE 206b fetches the mapping of the I_MESSAGE, the PCK, and the UID key of the initiating UE 206b, and checks whether the received I_MESSAGE exists in the stored mapping for the UID key of the initiating UE 206b. If the received I_MESSAGE does not exist in the stored mapping, at step 704, the terminating UE 206b decodes the I_MESSAGE to obtain the PCK. The PCK may be obtained by validating the signature included in the received I_MESSAGE, and decrypting the encapsulated PCK included in the received I_MESSAGE. The terminating UE 206b further stores the I_MESSAGE and the PCK in the storage 302.

If the received I_MESSAGE exists in the stored mapping for the initiating UE 206a, at step 706, the terminating UE 206b checks whether the I_MESSAGE that exists for the initiating UE 206b matches with the received I_MESSAGE. If the I_MESSAGE that exists for the initiating UE 206b does not match with the received I_MESSAGE, at step 704, the terminating UE 206b decodes the I_MESSAGE to obtain the PCK and stores the I_MESSAGE and the PCK in the storage 302.

If the I_MESSAGE that exists for the initiating UE 206b matches with the received I_MESSAGE, at step 708 the terminating UE 206b fetches the PCK mapped with the corresponding I_MESSAGE from the stored mapping and reuses the fetched PCK for the initiated private call. At step 710, the terminating UE 206b uses the fetched PCK/the PCK obtained by decoding the I_MESSAGE for decrypting the voice packets received from the initiating UE 206a.

Figure 8:
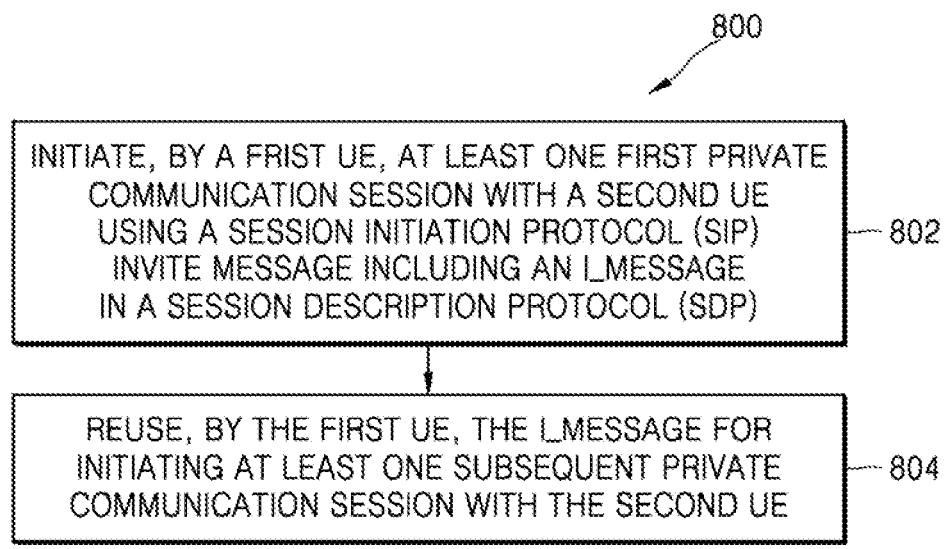
FIG. 8 is a flow diagram depicting a method for initiating the private communication session using the MC services, according to embodiments as disclosed herein.

FIG. 8 is a flow diagram 800 depicting a method for initiating the private communication session using the MC services, according to embodiments as disclosed herein.

At step 802, the method includes initiating, by the initiating/first UE 206a, at least one first private communication session with the second UE 206b using the SIP invite message including the I_MESSAGE in the SDP.

At step 804, the method includes reusing, by the initiating/first UE 206a, the I_MESSAGE for initiating at least one subsequent private communication session with the second UE 206b. The various actions in method 800 may be performed in the order presented, in a different order or simultaneously. Further, in some embodiments, some actions listed in FIG. 8 may be omitted.

The embodiments disclosed herein may be implemented through at least one software program running on at least one hardware device and performing network management functions to control the elements. The elements shown in FIGS. 2-3 may be at least one of a hardware device, or a combination of hardware device and software module.

The embodiments disclosed herein describe methods and systems for initiating a private communication session using Mission Critical (MC) services. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the disclosure may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein may be practiced with modification within the scope of the embodiments as described herein.

What is claimed is:

1. A method for initiating a private communication session by a first user equipment (UE), the method comprising:
    initiating, by the first UE, at least one private communication session with a second UE using a Session Initiation Protocol (SIP) INVITE message comprising an I_MESSAGE; and
    reusing, by the first UE, the I_MESSAGE for initiating at least one subsequent private communication session with the second UE,
    wherein the reusing, by the first UE, the I_MESSAGE for initiating the at least one subsequent private communication session with the second UE comprises:
        checking whether the I_MESSAGE exists for the second UE using the stored mapping of the I_MESSAGE, at least one validity value, a private communication session key, and a user identifier (UID) key of the second UE, on detecting a trigger initiated for the at least one subsequent private communication session with the second UE;
        checking validity of the I_MESSAGE based on the at least one validity value mapped with the I_MESSAGE, based on determining that the I_MESSAGE exists for the second UE;
        determining that the I_MESSAGE is valid, based on determining that the at least one validity value mapped with the I_MESSAGE is not expired;
        fetching the I_MESSAGE from the stored mapping of the I_MESSAGE, the at least one validity value, the private communication session key, and the UID key of the second UE, on determining that the I_MESSAGE is valid; and
        reusing the fetched I_MESSAGE for initiating the at least one subsequent private communication session with the second UE.

2. The method of claim 1, wherein the at least one private communication session and the at least one subsequent private communication session are initiated using Mission Critical (MC) services.

3. The method of claim 2, wherein the at least one private communication session and the at least one subsequent private communication session comprise at least one of a private voice call, a private data session, and a private video session.

4. The method of claim 1, further comprising:
    fetching, by the first UE and the second UE, a key material from an MC server prior to an initiation of the at least one private communication session and the at least one subsequent private communication session for creating the I_MESSAGE in a Session Description Protocol (SDP),
    wherein the key material comprises a user signing key and a user decryption key to generate a UID key of the first UE, and the UID key of the second UE.

5. The method of claim 4, wherein the I_MESSAGE is created using a Sakai-Kasahara Key Encryption in Multimedia Internet Keying (MIKEY_SAKKEY) encryption method.

6. The method of claim 5, wherein the created I_MESSAGE comprises the private communication session key which is encrypted, a private communication session key identifier, and a signature.

7. The method of claim 6,
    wherein the private communication session key is encrypted using the UID key of the second UE to secure the at least one private communication session and the at least one subsequent private communication session;
    wherein the private communication session key identifier indicates a purpose of the private communication session key; and
    wherein the signature comprises the UID key of the first UE.

8. The method of claim 4, further comprising:
    defining at least one validity value for the I_MESSAGE, wherein the at least one validity value is a pre-defined time period, and wherein the at least one validity value is defined based on at least one of a frequency of private communication sessions initiated between the first UE and the second UE, and requirements of users of a communication system comprising the first UE and the second UE;
    mapping the I_MESSAGE with the at least one validity value, the private communication session key included in the I_MESSAGE, and the UID key of the second UE; and
    storing the mapping of the I_MESSAGE, the at least one validity value, the private communication session key, and the UID key of the second UE in a storage.

9. The method of claim 1, further comprising:
    fetching, by the first UE, the private communication session key associated with the reused I_MESSAGE from the stored mapping of the I_MESSAGE, the at least one validity value, the private communication session key, and the UID key of the second UE; and
    reusing, by the first UE, the fetched private communication session key to encrypt private communication packets related to the initiated at least one subsequent private communication session.

10. The method of claim 9, further comprising:
    decoding, by the second UE, the I_MESSAGE to obtain the private communication session key, on receiving a private communication session initiation request comprising the I_MESSAGE from the first UE for the at least one private communication session;
    mapping, by the second UE, the decoded I_MESSAGE with the obtained private communication session key and the UID key of the first UE;
    storing, by the second UE, the mapping of the I_MESSAGE, the private communication session key, and the UID key of the first UE in a storage;
    receiving, by the second UE, the private communication session initiation request comprising the SIP INVITE message with the I_MESSAGE in the SDP from the first UE for the at least one subsequent private communication session; and
    reusing, by the second UE, the stored private communication session key for the at least one subsequent private communication.

11. The method of claim 10, wherein reusing, by the second UE, the stored private communication session key for the at least one subsequent private communication comprises:
    checking whether the I_MESSAGE exists for the first UE using the stored mapping of the I_MESSAGE, the private communication session key, and the UID key of the first UE, on receiving the I_MESSAGE from the first UE for the at least one subsequent private communication session;

determining whether the received I_MESSAGE matches with the stored I_MESSAGE, based on determining that the stored I_MESSAGE exists for the first UE;

fetching the private communication session key associated with the I_MESSAGE that exists for the first UE from the stored mapping of the I_MESSAGE, the private communication session key, and the UID key of the first UE; and reusing the fetched private communication session key for the at least one subsequent private communization session initiated by the first UE.

12. The method of claim 11, further comprising:

reusing, by the second UE, the fetched private communication session key to decrypt private communication packets received from the first UE during the initiated at least one subsequent private communization session.

13. A user equipment (UE) for initiating a private communication session, the UE comprising:

a transceiver; and at least one processor coupled with the transceiver and configured to:

initiate at least one private communication session with another UE using a Session Initiation Protocol (SIP) INVITE message comprising an I_MESSAGE; and reuse the I_MESSAGE for initiating at least one subsequent private communication session with the other UE UE, wherein in reusing the I_MESSAGE for initiating the at least one subsequent private communication session with the other UE, the at least one processor is further configured to:

check whether the I_MESSAGE exists for the other UE using the stored mapping of the I_MESSAGE, at least one validity value, a private communication session key, and a user identifier (UID) key of the other UE, on detecting a trigger initiated for the at least one subsequent private communication session with the other UE;

check validity of the I_MESSAGE based on the at least one validity value mapped with the I_MESSAGE, based on determining that the I_MESSAGE exists for the other UE;

determine that the I_MESSAGE is valid, based on determining that the at least one validity value mapped with the I_MESSAGE is not expired;

fetch the I_MESSAGE from the stored mapping of the I_MESSAGE, the at least one validity value, the private communication session key, and the UID key of the other UE, on determining that the I_MESSAGE is valid; and reuse the fetched I_MESSAGE for initiating the at least one subsequent private communication session with the other UE.

14. The UE of claim 13, wherein the at least one processor is further configured to fetch a key material from a mission critical server prior to the initiation an initiation of the at least one and subsequent private communication sessions for creating the I_MESSAGE in a Session Description Protocol (SDP), wherein the key material comprises a user signing key and a user decryption key used to generate the UID key of the UE, and the UID key of the other UE.

15. The UE of claim 14, wherein the I_MESSAGE comprises the private communication session key which is encrypted, a private communication session key identifier, and a signature.

16. The UE of claim 15, wherein the private communication session key is encrypted using the UID key of the other UE to secure the at least one private communication session and the at least one subsequent private communication session;

wherein the private communication session key identifier indicates a purpose of the private communication session key; and wherein the signature comprises the UID key of the UE.

17. The UE of claim 14, wherein the at least one processor is further configured to:

define at least one validity value for the I_MESSAGE, wherein the at least one validity value is a pre-defined time period, and wherein the at least one validity value is defined based on at least one of a frequency of private communication sessions initiated between the UE and the other UE, and requirements of users of a communication system comprising the UE and the other UE;

map the I_MESSAGE with the at least one validity value, the private communication session key included in the I_MESSAGE, and the UID key of the other UE; and store the mapping of the I_MESSAGE, the at least one validity value, the private communication session key, and the UID key of the other UE in a storage.

18. The UE of claim 13, wherein the at least one processor is further configured to:

fetch the private communication session key associated with the reused I_MESSAGE from the stored mapping of the I_MESSAGE, the at least one validity value, the private communication session key, and the UID key of the other UE; and reuse the fetched private communication session key to encrypt private communication packets related to the initiated at least one subsequent private communication session.

* * * * *